Patented Apr. 20, 1937

2,077,681

UNITED STATES PATENT OFFICE 2,077,681

MIXED TERTIARY HEXYL ETHERS

Theodore Evans, Kensington Park, and Karl R. Edlund, Berkeley, Calif., assignors to Shell Development Company, San Francisco, Calif., a corporation of Delaware No Drawing. Original application February 9, 1935, Serial No. 5,854. Divided and this application June 20, 1936, Serial No. 86,337

3 Claims. (Cl. 260—151)

This invention relates to mixed tertiary hexyl ethers of the general formula R—O—R', wherein R represents an alkyl radical containing six carbon atoms one of which is linked to the oxygen atom as well as to three carbon atoms and —O—R' represents the organic residue of an alcohol containing no more than two carbon atoms.

We are aware that certain elementary mixed tertiary ethers have been prepared by various methods but to the best of our knowledge no one has prepared the subaltern genera and species which we claim to constitute our invention.

In our United States Patent 1,968,601, dated July 31, 1934, we have described a process for the production of mixed tertiary ethers which process comprises reacting a tertiary-base olefine (an olefine capable of forming a tertiary alcohol on hydration) in the presence of a condensing catalyst such as sulphuric acid.

Now we have discovered that when a tertiary hexylene is reacted with an alcohol containing no more than two carbon atoms to the molecule, the aliphatic mixed tertiary hexyl ethers obtained are valuable and novel compounds.

When a mixture of hexylenes is reacted with methyl alcohol, for example, the mixed tertiary ether product may comprise two isomeric tertiary hexyl methyl ethers, and when a mixture of hexylenes is reacted with ethyl alcohol the product may comprise two isomeric tertiary hexyl ethyl ethers. All tertiary hexyl methyl and tertiary hexyl ethyl ethers are within the scope of our invention.

The tertiary hexyl methyl ethers and the tertiary hexyl ethyl ethers are useful for a wide variety of purposes. They may be used alone, in admixture with each other, or mixed with other substances, as diluting agents, for solutions of various lacquers and varnishes, for example, for solutions of nitrocellulose in ethyl acetate, as solvents and as extracting agents for organic substances such as carboxylic acids, alkaloids, essential oils, essences and the like. The mixed ethers of this invention form azeotropes with water, which azeotropes contain relatively large amounts of water. This water-carrying property of the ethers makes them particularly suitable water-removing agents in the dehydration of aqueous mixtures of organic compounds as alcohols, aldehydes, ketones, aliphatic carboxylic acids and the like.

The following example illustrates a suitable method for the preparation of the mixed tertiary hexyl ethers of our invention.

Tertiary hexyl methyl ether

Tertiary-base hexylenes were first prepared by scrubbing a hexane-hexylene hydrocarbon fraction with 65% sulphuric acid to absorb the hexylenes, diluting the acid liquor with water, and boiling out the absorbed hydrocarbons. The collected hydrocarbon mixture was then fractionated, the material boiling in the temperature range of 60° C. to 72° C. being taken as the desired hexylenes.

For the preparation of the mixed tertiary hexyl ether, above 350 gm. of the hexylene fraction were reacted with 150 gm. of methyl alcohol and 18 gm. of sulphuric acid at a temperature of about 75° C. for about 1.5 hours. At the end of this time the reaction mixture was washed twice with an equal volume of dilute caustic, dried and distilled. The desired product, probably a mixture of isomeric tertiary hexyl methyl ethers, was obtained at a temperature of 113° C. The yield of the product was at least 75 gm.

The tertiary hexyl ethyl ethers can be prepared in an analogous manner by replacing the methyl alcohol used in the example by ethyl alcohol.

The foregoing description has been made rather detailed for clearness of understanding only, and no unnecessary limitations should be understood therefrom, but the appended claims should be construed as broadly as possible in view of the prior art.

This application is a division of our application, Serial No. 5,854 filed February 9, 1935.

We claim as our invention:

1. The mixed tertiary ether of the formula R—O—R', wherein R represents a tertiary hexyl radical and R' represents the alkyl radical of an alcohol containing no more than two carbon atoms.

2. The mixed tertiary ether of the formula R—O—R', wherein R represents a tertiary hexyl radical and R' represents the methyl radical.

3. The mixed tertiary ether of the formula R—O—R', wherein R represents a tertiary hexyl radical and R' represents the ethyl radical.

THEODORE EVANS.
KARL R. EDLUND.